United States Patent
Seo et al.

(10) Patent No.: US 8,681,847 B2
(45) Date of Patent: Mar. 25, 2014

(54) APPARATUS AND METHOD FOR EQUALIZING CHANNEL BASED ON CHANNEL ESTIMATION

(75) Inventors: Jae-Hyun Seo, Daejon (KR); Heung-Mook Kim, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 91 days.

(21) Appl. No.: 13/057,164

(22) PCT Filed: Nov. 28, 2008

(86) PCT No.: PCT/KR2008/007066
§ 371 (c)(1),
(2), (4) Date: Feb. 2, 2011

(87) PCT Pub. No.: WO2010/024501
PCT Pub. Date: Mar. 4, 2010

(65) Prior Publication Data
US 2011/0142118 A1    Jun. 16, 2011

(30) Foreign Application Priority Data
Aug. 28, 2008 (KR) .................. 10-2008-0084601

(51) Int. Cl.
*H03H 7/30* (2006.01)
*H03H 7/40* (2006.01)
*H03K 5/159* (2006.01)

(52) U.S. Cl.
USPC .......................................... 375/229; 333/18

(58) Field of Classification Search
USPC ...................................................... 375/229
See application file for complete search history.

(56) References Cited

U.S. PATENT DOCUMENTS

| | | | |
|---|---|---|---|
| 7,340,000 B1 | 3/2008 | Hart et al. | |
| 2003/0043887 A1* | 3/2003 | Hudson | 375/144 |
| 2004/0047284 A1* | 3/2004 | Eidson | 370/203 |
| 2005/0157636 A1 | 7/2005 | Wen et al. | |
| 2005/0249266 A1* | 11/2005 | Brown et al. | 375/133 |
| 2006/0280114 A1* | 12/2006 | Osseiran et al. | 370/208 |
| 2007/0258510 A1* | 11/2007 | Des Noes et al. | 375/147 |
| 2010/0260288 A1* | 10/2010 | Aoki et al. | 375/296 |

OTHER PUBLICATIONS

Berna Ozbeck et al., "Pilot-Symbol-Aided Iterative Channel Estimation for OFDM-Based Systems", Proceeding of the 13th European Signal Processing Conference, Sep. 8, 2005.
Yifei Zhao et al., Frequency—Domain Equilization using Interactive Channel Estimation for High-Speed Transmission with Cyclic-Prefix MC-DC-CDMA, the 14th IEEE 2003 International Symposium on Personal, Indoor, and Mobile Radio Communications Proceedings, vol. 1, pp. 666-669, Sep. 10, 2003.
International Search Report for corresponding International Application PCT/KR2008/007006; mailed Jul. 13, 2009.

* cited by examiner

*Primary Examiner* — Erin File
(74) *Attorney, Agent, or Firm* — Staas & Halsey LLP

(57) ABSTRACT

Provided is a channel equalizing apparatus and method for improving channel equalization performance in an Orthogonal Frequency Division Multiplexing (OFDM) reception system applied to digital broadcasting or a communication system. The apparatus, includes: a channel estimating unit for performing channel estimation by using a pilot signal of a frequency domain; a digital filtering unit for changing a characteristic of a channel in a time domain based on an estimated channel estimation result; and a channel equalizing unit for performing channel equalization of a frequency domain on the signal after changing the channel characteristic.

12 Claims, 4 Drawing Sheets

APPARATUS AND METHOD FOR EQUALIZING CHANNEL BASED ON CHANNEL ESTIMATION

CROSS REFERENCE TO RELATED APPLICATIONS

This application claims the benefit under 35 U.S.C. Section 371, of PCT International Application No. PCT/KR2008/007066, filed Nov. 28, 2008, which claimed priority to Korean Application No. 10-2008-0084601, filed Aug. 28, 2008, the disclosures of which are hereby incorporated by reference.

TECHNICAL FIELD

The present invention relates to a channel equalizing apparatus and method for improving channel equalization performance in an Orthogonal Frequency Division Multiplexing (OFDM) reception system applied to digital broadcasting or a communication system; and, more particularly, to an apparatus and method for equalizing a channel based on channel estimation which improves channel equalization performance of a frequency domain by performing coarse channel estimation by using a pilot signal of the frequency domain and changing a characteristic of the channel by using a digital filter in a time domain.

This work was supported by the IT R&D program for MIC/IIIA [2006-S-016, "Development of Distributed Translator Technology for Terrestrial DTV"].

BACKGROUND ART

Generally, a transmission system of an Orthogonal Frequency Division Multiplexing (OFDM) method is used in digital broadcasting or a communication system.

At this time, the OFDM transmission system inserts and transmits a pilot signal, which is used for frequency synchronization, symbol synchronization, and channel equalization in an OFDM reception system. Conventionally, since a channel equalizer of the OFDM reception system operates in a frequency domain, channel equalization performance deteriorates.

That is, the OFDM transmission system inserts and transmits the pilot signal in order to remove an effect of a multipath channel and the OFDM reception system performs channel equalization by using the pilot signal. When the same signal is received in different OFDM transmission systems and repeaters on a single frequency network (SFN), a 0 dB multipath signal is generated. When a channel is equalized by using the pilot signal in the frequency domain, performance deteriorates.

It will be described in detail hereinafter with reference to FIGS. 1 and 2.

FIG. 1 is a block diagram showing an OFDM transmission system using a conventional pilot signal.

As shown in FIG. 1, the OFDM transmission system using the conventional pilot signal includes a channel encoder 10, a mapper 12, an Inverse Fast Fourier Transform (IFFT) 13, a guard interval inserter 14, and a Digital-to-Analog converter (DAC) 15.

The channel encoder 10 performs channel encoding on data to be transmitted including video, audio, and multimedia data. The mapper 12 performs mapping on the channel-encoded data of the channel encoder 10 and converts the data into an OFDM symbol. The channel encoder 10 inserts a pilot signal 11 to be used as a reference signal for channel equalization, frequency synchronization and time symbol synchronization in the OFDM reception system. The IFFT 13 performs IFFT on the OFDM symbol of the frequency domain, which is mapped in the mapper 12 and includes the channel-encoded data and the pilot signal, and transforms the OFDM symbol of the frequency domain into an OFDM symbol of the time domain. The guard interval inserter 14 inserts a guard interval for each symbol of the OFDM symbols transformed into the data of the time domain by the IFFT 13. The DAC 15 converts the digital OFDM symbol into an analog OFDM signal after inserting the guard interval by the guard interval inserter 14 in order to transmit the OFDM symbol to the OFDM reception system.

To have a look at an operation of the OFDM transmission system using the conventional pilot signal, data to be transmitted, which include video, audio, and multimedia data, pass through the channel encoder 10 to correct an error occurring in a channel.

The channel-encoded data are converted into an OFDM symbol in the mapper 12 for conversion. At this time, the OFDM reception system inserts the pilot signal 11 to be used as a reference signal for channel equalization, frequency synchronization and time symbol synchronization.

Subsequently, IFFT is performed on the OFDM symbol of the frequency domain including the channel-encoded data and the pilot in the IFFT 13 and the OFDM symbol of the frequency domain is transformed into the OFDM symbol of the time domain. The guard interval is inserted in each OFDM symbol converted into the time domain data in the guard interval inserter 14. After inserting the guard interval, the digital OFDM symbol is converted into the analog OFDM signal through the DAC 15 and transmitted to the OFDM reception system.

FIG. 2 is a block diagram showing an OFDM reception system using the conventional pilot signal.

As shown in FIG. 2, the OFDM reception system using the conventional pilot signal includes an analog-to-digital converter (ADC) 20, a guard interval remover 21, an FFT 22, a pilot signal extractor 23, a channel equalizer 24, a demapper 25, and a channel decoder 26.

The ADC 20 converts a received analog OFDM signal into a digital OFDM symbol of a time domain. The guard interval remover 21 removes a guard interval from the digital OFDM symbol of the time domain converted in the ADC 20. The FFT 22 transforms the OFDM symbol of the time domain into an OFDM signal of the frequency domain through FFT after removing the guard interval in the guard interval remover 21. The pilot signal extractor 23 extracts a pilot signal from the OFDM signal of the frequency domain transformed in the FFT 22.

The channel equalizer 24 performs channel equalization on the OFDM signal of the frequency domain from the FFT 22 by using the pilot signal extracted by the pilot signal extractor 23 in order to remove an effect of the channel. The demapper 25 performs demapping on the OFDM signal of the frequency domain after channel equalization in the channel equalizer 24 in order to acquire channel-encoded data transmitted from the transmission system. The channel decoder 26 performs channel decoding on the OFDM signal of the frequency domain, which is demapped in the demapper 25, in order to extract the data to be transmitted in the transmission system.

An operation of the OFDM reception system using the conventional pilot signal will be described hereafter. A received analog OFDM signal is converted into a digital OFDM symbol of a time domain through the ADC 20. Subsequently, the guard interval is removed by the guard interval remover 21 in the converted digital OFDM symbol of the time domain. After removing the guard interval, the OFDM symbol of the time domain is transformed into the OFDM signal of the frequency domain through FFT in the FFT 22. The pilot signal extractor 23 extracts a pilot signal from the transformed OFDM signal of the frequency domain.

The channel equalizer 24 performs channel equalization on the OFDM signal of the frequency domain from the FFT 22 based on the extracted pilot signal in order to remove an effect of the channel. The channel-equalized OFDM signal of the frequency domain is demapped by the demapper 25 and outputted as channel-encoded data transmitted from the transmission system. Channel decoding is performed on the demapped and channel-encoded data in the channel decoder 26 and the data are extracted as the data to be transmitted in the transmission system, which include video, audio, and multimedia data.

As described above, to remove the effect of the multipath channel, the OFDM transmission system inserts and transmits the pilot signal and the OFDM reception system performs channel equalization by using the pilot signal. In a single frequency network (SFN), since different OFDM transmission systems and repeaters transmit the same signal, there is a case when the OFDM reception system receives a deteriorated signal such as a 0 dB multipath signal. In this case, channel equalization is performed by using the pilot signal in the frequency domain and fading occurs causing deep null. There is a problem when channel equalization using the pilot signal in the frequency domain causes performance deterioration.

DISCLOSURE

Technical Problem

The object of the present invention is to solve the problem of deteriorated channel equalization performance when channel equalization is performed in the frequency domain in an Orthogonal Frequency Division Multiplexing (OFDM) reception system.

An embodiment of the present invention is directed to providing an apparatus and method for equalizing a channel based on channel estimation which improves channel equalization performance of a frequency domain by changing a characteristic of the channel in a time domain.

That is, the embodiment of the present invention is directed to providing an apparatus and method for equalizing the channel based on channel estimation which improves channel equalization performance of the frequency domain by performing coarse channel estimation by using the pilot signal of the frequency domain and changing a characteristic of the channel by using a digital filter in the time domain.

The objects of the present invention are not limited to the ones mentioned above. Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a channel equalizing apparatus, including: a channel estimating unit for performing channel estimation by using a pilot signal of a frequency domain; a digital filtering unit for changing a characteristic of a channel in a time domain based on an estimated channel estimation result; and a channel equalizing unit for performing channel equalization of a frequency domain on the signal after changing the channel characteristics.

In accordance with another aspect of the present invention, there is provided a channel equalizing method, including: performing channel estimation by using a pilot signal of a frequency domain; changing a characteristic of a channel in a time domain based on an estimated channel estimation result; and performing channel equalization of a frequency domain on the signal after changing the channel characteristic in the time domain.

Advantageous Effects

The present invention improves the entire channel equalization performance by changing a characteristic of a channel in a time domain.

That is, the present invention improves channel equalization performance of a frequency domain by performing coarse channel estimation by using a pilot signal of the frequency domain and changing the characteristic of the channel by using a digital filter in the time domain.

Also, the present invention improves channel equalization performance of an Orthogonal Frequency Division Multiplexing (OFDM) reception system only through coarse channel estimation using a pilot signal for a channel equalizer without changing a structure of the channel equalizer of the typical OFDM reception system.

That is, the present invention improves channel equalization performance without increasing complexity realized by performing coarse channel estimation by using the pilot signal and acquiring a channel impulse response.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

To have a look at a point of the present invention, the present invention acquires a channel impulse response through coarse channel estimation by using a pilot signal of a frequency domain in an Orthogonal Frequency Division Multiplexing (OFDM) reception signal passing through multipath channel and applies the acquired channel impulse response as a coefficient of a digital filter. For example, a 0 dB multipath signal is removed after passing through the digital filter. Otherwise, a channel characteristic of the 0 dB multipath signal is changed into a decreased multipath signal. When channel equalization is performed again by using the pilot signal in the frequency domain, channel equalization performance is improved in comparison with when the digital filter is not applied.

Figure 1:
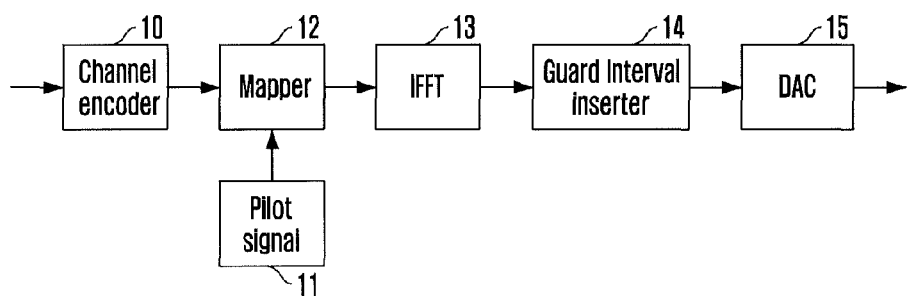
FIG. 1 is a block diagram showing an Orthogonal Frequency Division Multiplexing (OFDM) transmission system using a conventional pilot signal.
Figure 2:
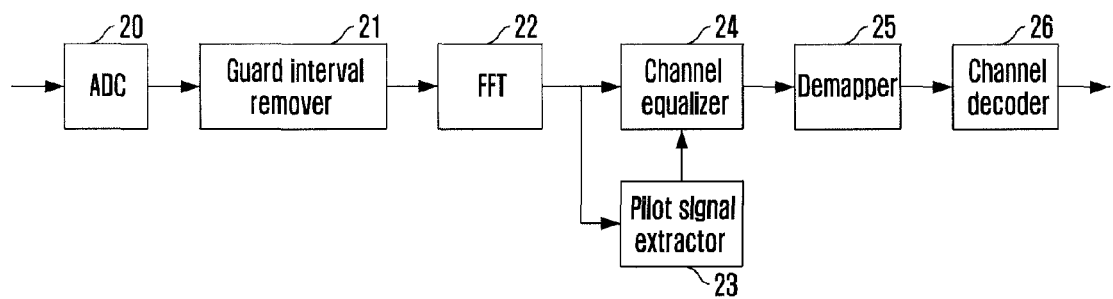
FIG. 2 is a block diagram showing an OFDM reception system using the conventional pilot signal.
Figure 3:
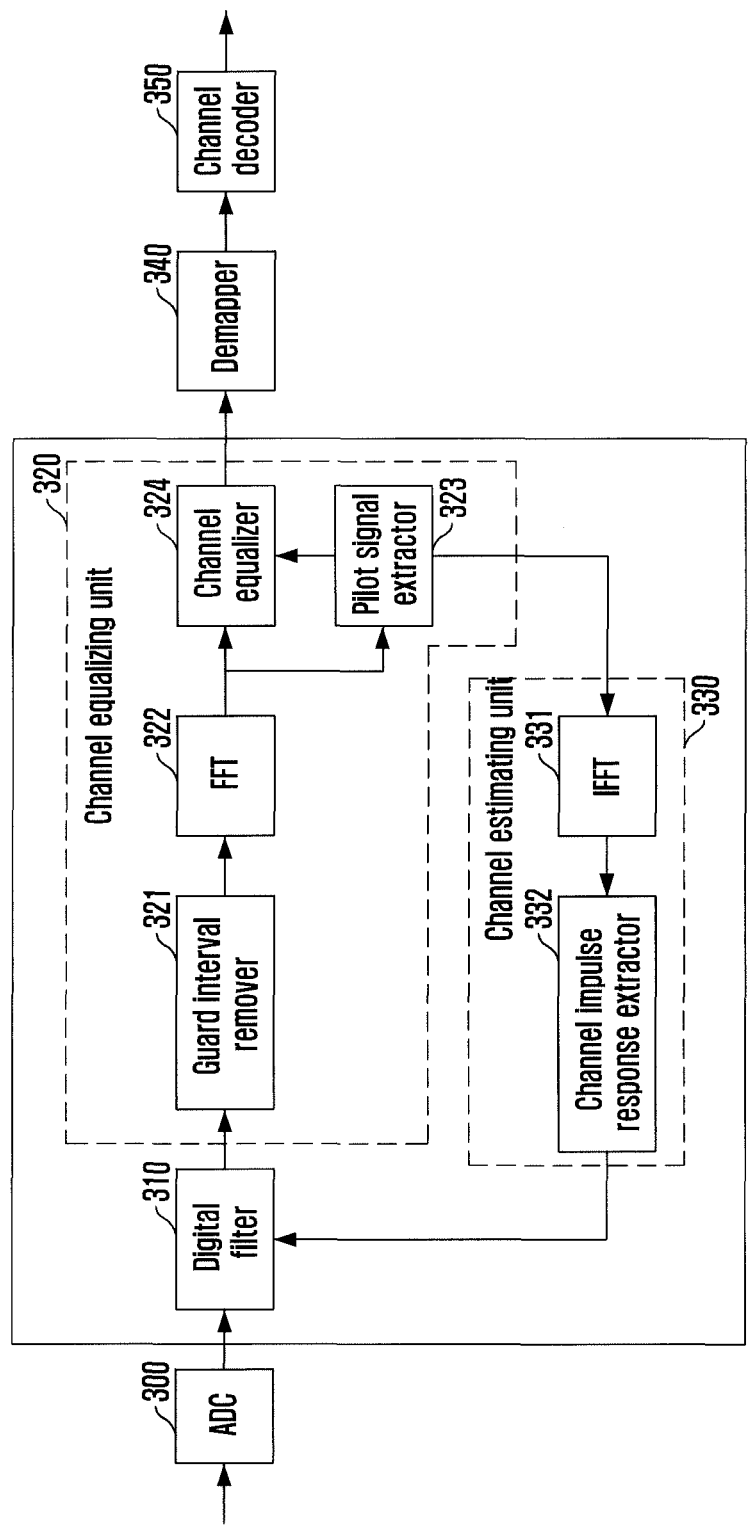
FIG. 3 is a block diagram showing a channel equalizing apparatus of the OFDM reception system based on channel estimation in accordance with an embodiment of the present invention.

FIG. 3 is a block diagram showing a channel equalizing apparatus of the OFDM reception system based on channel estimation in accordance with an embodiment of the present invention. In particular, FIG. 3 shows the channel equalizing apparatus of the OFDM reception system based on the channel impulse response after coarse channel estimation using a pilot signal.

As shown in FIG. 3, the channel equalizing apparatus of the OFDM reception system based on channel estimation in accordance with the present invention includes a channel estimating unit 330, a digital filter 310 and a channel equalizing unit 320.

The channel estimating unit 330 performs coarse channel estimation by using a pilot signal of a frequency domain. The digital filter 310 changes a characteristic of a channel in a time domain by using a coarse channel estimation result estimated in the channel estimating unit 330 as a tap coefficient. The channel equalizing unit 320 performs channel equalization in the frequency domain on the signal after changing the channel characteristic in the digital filter 310.

In order to acquire the channel characteristic in the time domain, the channel estimating unit 330 includes an Inverse FFT (IFFT) 331 and a channel impulse response extractor 332. The IFFT 331 performs IFFT on a pilot signal extracted from a pilot signal extractor 323 of the channel equalizing unit 320. The channel impulse response extractor 332 extracts a channel impulse response based on the channel characteristic in the time domain acquired in the IFFT 331 and transmits the channel impulse response to the digital filter 310.

After performing coarse channel estimation on the channel impulse response in the channel estimating unit 330, the digital filter 310 performs digital filtering on the digital OFDM symbol of the time domain from the ADC 300 by using the channel impulse response as a tap coefficient.

The channel equalizing unit 320 includes a guard interval remover 321, a FFT 322, a pilot signal extractor 323, and a channel equalizer 324. The guard interval remover 321 removes a guard interval from the OFDM symbol of the time domain after digital filtering in the digital filter 310. The FFT 322 transforms the OFDM symbol of the time domain into an OFDM signal of a frequency domain through FFT after removing the guard interval by the guard interval remover 321. The pilot signal extractor 323 extracts a pilot signal from the OFDM signal of the frequency domain transformed by the FFT 322 and transmits the pilot signal to the IFFT 331 of channel estimating unit 330. In order to remove the effect of the channel, the channel equalizer 324 performs channel equalization on the OFDM signal of the frequency domain from the FFT 322 by using the pilot signal extracted by the pilot signal extractor 323.

An entire configuration of the OFDM reception system including the channel equalizing apparatus based on channel estimation in accordance with the present invention will be described hereinafter with reference to FIG. 3. As shown in FIG. 3, the OFDM reception system including the channel equalizing apparatus based on channel estimation in accordance with the present invention includes the ADC 300, the digital filter 310, the guard interval remover 321, the FFT 322, the pilot signal extractor 323, the channel equalizer 324, the IFFT 331, the channel impulse response extractor 332, a demapper 340, and a channel decoder 350.

The ADC 300 converts a received analog OFDM signal into a digital OFDM symbol of a time domain. The digital filter 310 performs digital filtering on the digital OFDM symbol of the time domain from the ADC 300 by using a channel impulse response as a tap coefficient after coarse channel estimation. The guard interval remover 321 removes a guard interval from the OFDM symbol of the time domain after digital filtering in the digital filter 310. The FFT 322 transforms the OFDM symbol of the time domain into an OFDM signal of the frequency domain through FFT after removing the guard interval by the guard interval remover 321.

The pilot signal extractor 323 extracts a pilot signal from the OFDM signal of the frequency domain transformed by the FFT 322. In order to remove an effect of the channel, the channel equalizer 324 performs channel equalization on the OFDM signal of the frequency domain from the FFT 322 by using the pilot signal extracted by the pilot signal extractor 323.

The IFFT 331 performs IFFT on the pilot signal extracted by the pilot signal extractor 323 in order to acquire the channel characteristic in the time domain. The channel impulse response extractor 332 extracts a channel impulse response based on the channel characteristic of the time domain acquired in the IFFT 331 and transmits the channel impulse response to the digital filter 310.

In order to acquire the channel-encoded data transmitted from the transmission system, the demapper 340 performs demapping on the OFDM signal of the frequency domain after channel equalization in the channel equalizer 324. The channel decoder 350 performs channel decoding on the OFDM signal of the frequency domain demapped by the demapper 340 in order to extract data to be transmitted in the transmission system.

An operation of the OFDM reception system including the channel equalizing apparatus based on channel estimation in accordance with the present invention will be described. The received analog OFDM signal is converted into a digital OFDM symbol of a time domain through the ADC 300. Subsequently, digital filtering is performed on the converted digital OFDM symbol of the time domain by using the channel impulse response as a tap coefficient through the digital filter 310. At this time, a coefficient of an initial Finite Impulse Response (FIR) filter has a by-pass characteristic.

Subsequently, the OFDM symbol of the time domain, which is an output signal of the digital filter 310, removes a guard interval by the guard interval remover 321. After removing the guard interval, the OFDM symbol of the time domain is transformed into the OFDM signal of the frequency domain through FFT in the FFT 322. The pilot signal extractor 323 extracts a pilot signal from the transformed OFDM signal of the frequency domain.

Subsequently, the channel equalizer 324 performs channel equalization on the OFDM signal of the frequency domain from the FFT 322 by using the extracted pilot signal in order to remove an effect of the channel. At this time, the IFFT 331 acquires the channel characteristic of the time domain by performing IFFT on the extracted pilot signal.

Subsequently, the channel impulse response extractor 332 extracts channel impulse response based on the acquired channel characteristic of the time domain. The extracted channel impulse response is applied as the tap coefficient of the digital filter 310. At this time, the tap coefficient of the digital filter 310 has a FIR format. That is, since the tap coefficient of the FIR filter uses only a value corresponding to a multipath signal of a large size except a main path signal, which means a size larger than 0.5 in comparison with the main path signal including 0 dB, in impulse response values, the 0 dB multipath signal can be removed without increasing system complexity.

Subsequently, the channel-equalized OFDM signal of the frequency domain is demapped by the demapper 340 and outputted as channel-encoded data, which is transmitted from the transmission system. The channel decoder 350 performs channel decoding on the demapped and channel-encoded data and the data are extracted as the data to be transmitted from the transmission system, which includes data video, audio, and multimedia data.

Figure 4:
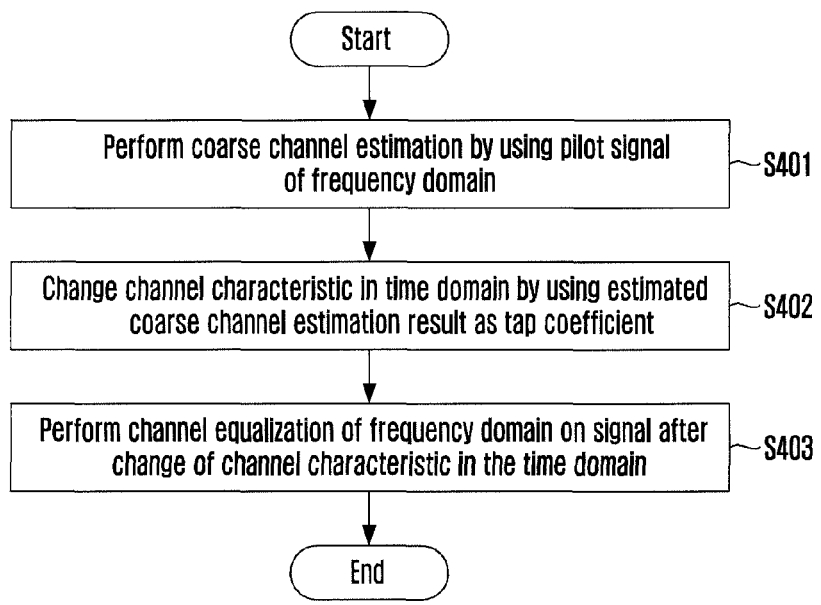
FIG. 4 is a flowchart describing a channel equalizing method of the OFDM reception system based on channel estimation in accordance with an embodiment of the present invention.

FIG. 4 is a flowchart describing a channel equalizing method of the OFDM reception system based on channel estimation in accordance with an embodiment of the present invention. Since the detailed operation and embodiment are described above, only an entire operation will be described in brief herein.

At step S401, the channel estimating unit 330 performs coarse channel estimation by using a pilot signal of a frequency domain.

At step S402, the digital filter 310 changes a channel characteristic in a time domain by using a coarse channel estimation result estimated in the channel estimating unit 330 as a tap coefficient.

At step S403, the channel equalizing unit 320 performs channel equalization of a frequency domain on the signal after changing the channel characteristic in the digital filter 310.

Figure 5:
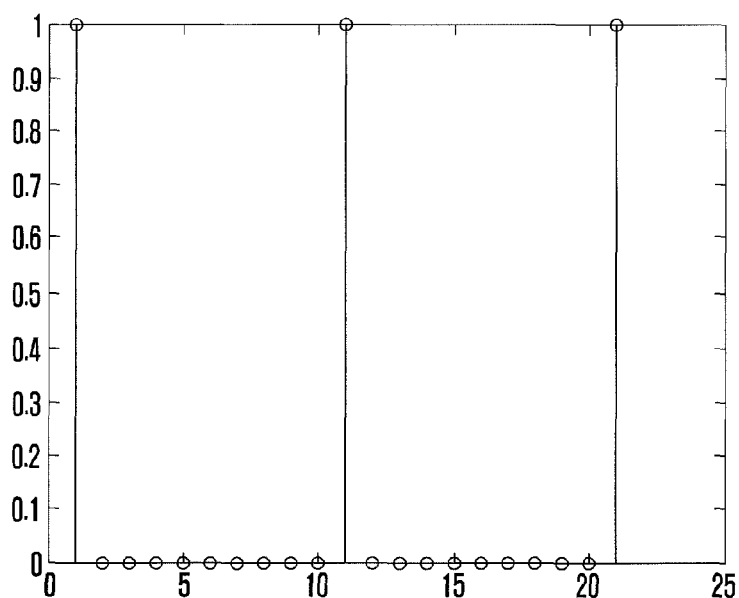
FIG. 5 is a graph showing an impulse response characteristic in a single frequency network (SFN) channel.

FIG. 5 is a graph showing an impulse response characteristic in a single frequency network (SFN) channel.

FIG. 5 shows a channel impulse response representing an SFN channel as a 0 dB multipath channel having 10 and 20 sample delays except a main path signal. When a size ratio between the multipath signals is a 0 dB channel, deep null causing performance deterioration of the channel equalizer is generated in the frequency domain.

Figure 6:
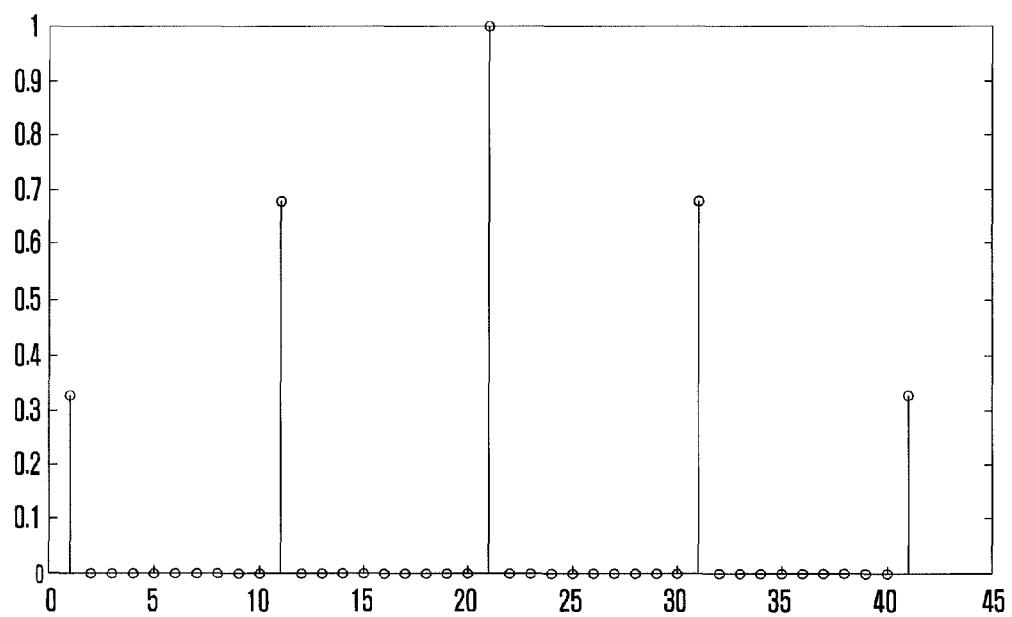
FIG. 6 is a graph showing an impulse response characteristic which is channel-estimated after applying a digital filter.

FIG. 6 is a graph showing an impulse response characteristic which is channel-estimated after applying a digital filter.

FIG. 6 shows an impulse response estimated after performing coarse channel estimation on a signal passing through a channel as shown in FIG. 5 and changing the channel characteristic by using the digital filter. The channel characteristic is shown after the 0 dB multipath channel except the main path signal is removed. Also, the number of multipath channels increases but the size of the 0 dB multipath channel decreases more than about 30%. Through coarse channel estimation of the present invention, deterioration of channel equalization performance is prevented in the SFN environment such as the 0 dB multipath signal although channel equalization performs well on a plurality of multipath signals due to the characteristic of the OFDM system.

As described above, the technology of the present invention can be realized as a program. A code and a segment of a code forming the program can be easily inferred by a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

The present application contains subject matter related to Korean Patent Application No. 2008-0084601, filed in the Korean Intellectual Property Office on Aug. 28, 2008, the entire contents of which are incorporated herein by reference.

While the present invention has been described with respect to certain preferred embodiments, it will be apparent to those skilled in the art that various changes and modifications may be made without departing from the scope of the invention as defined in the following claims.

Industrial Applicability

The present invention for improving reception performance of an Orthogonal Frequency Division Multiplexing (OFDM) signal passing through a deteriorated multipath channel is applicable when a channel equalizer such as an OFDM reception system is realized.

What is claimed is:

1. A channel equalizing apparatus, comprising:
    a channel estimating means for performing channel estimation by using a pilot signal of a frequency domain;
    a digital filtering means for changing a channel characteristic of a channel in a time domain based on an estimated channel estimation result; and
    a channel equalizing means for performing channel equalization of a frequency domain on the signal after changing the channel characteristic,
    wherein the digital filtering means performs digital filtering on a digital Orthogonal Frequency Division Multiplexing (OFDM) symbol of the time domain by using a channel impulse response according to the channel characteristic of the time domain as a tap coefficient.

2. The apparatus of claim 1, wherein the channel estimating means acquires the channel characteristic of the time domain by using the pilot signal of the frequency domain and performs channel estimation based on the channel characteristic of the time domain.

3. The apparatus of claim 2, wherein the channel estimating means includes:
    an Inverse Fast Fourier Transform (IFFT) for performing IFFT on the pilot signal in order to acquire the channel characteristic of the time domain; and
    a channel impulse response extractor for extracting a channel impulse response based on the channel characteristic of the time domain acquired in the IFFT.

4. The apparatus of claim 1, wherein the channel equalizing means includes:
    a guard interval remover for removing a guard interval form the OFDM symbol of the time domain after digital filtering in the digital filtering means;
    an FFT for transforming the OFDM symbol of the time domain into an OFDM signal of the frequency domain through FFT after removing of the guard interval;
    a pilot signal extractor for extracting the pilot signal from the OFDM signal of the frequency domain transformed in the FFT; and
    a channel equalizer for performing channel equalization on the OFDM signal of the frequency domain from the FFT by using the pilot signal in order to remove an effect of the channel.

5. The apparatus of claim 1, wherein the digital filtering means removes a 0 dB multipath signal.

6. The apparatus of claim 1, wherein the digital filtering means decreases the 0 dB multipath signal.

7. A channel equalizing method, comprising:
    performing channel estimation by using a pilot signal of a frequency domain;
    changing a characteristic of a channel in a time domain based on an estimated channel estimation result; and performing channel equalization of a frequency domain on the signal after changing the channel characteristic in the time domain,
wherein digital filtering is performed on a digital Orthogonal Frequency Division Multiplexing (OFDM) symbol of the time domain by using an extracted channel impulse response according to the channel characteristic of the time domain as a tap coefficient.

8. The method of claim 7, wherein a channel characteristic of a time domain is acquired by using the pilot signal of the frequency domain and the channel estimation is performed based on the channel characteristic of the time domain.

9. The method of claim 8, wherein said performing channel estimation includes:
acquiring the channel characteristic of the time domain by performing Inverse Fast Fourier Transform (IFFT) on the pilot signal of the frequency domain; and
extracting the channel impulse response based on the channel characteristic of the time domain.

10. The method of claim 7, wherein the performing channel equalization of the frequency domain on the signal includes:
removing a guard interval from the OFDM symbol of the time domain after digital filtering;
transforming the OFDM symbol of the time domain into an OFDM signal of a frequency domain through FFT after removing the guard interval;
extracting the pilot signal from the transformed OFDM signal of the frequency domain; and
performing channel equalization on the transformed OFDM signal of the frequency domain by using the pilot signal in order to remove an effect of the channel.

11. The method of claim 7, wherein a 0 dB multipath signal is removed.

12. The method of claim 7, wherein the 0 dB multipath signal is decreased.

* * * * *